United States Patent [19]

Mukouyama et al.

[11] Patent Number: 4,738,858

[45] Date of Patent: Apr. 19, 1988

[54] METHOD OF PRODUCING FRUIT WINE, ETC.

[75] Inventors: Shigeki Mukouyama; Tsuneo Gotoh; Akira Yusen, all of Tokyo; Noriyuki Harada, Ihara, all of Japan

[73] Assignee: Nippon Light Metal Company Limited, Tokyo, Japan

[21] Appl. No.: 768,810

[22] Filed: Aug. 23, 1985

[30] Foreign Application Priority Data

Aug. 29, 1984 [JP] Japan ................... 59-178248

[51] Int. Cl.⁴ .............................. C12G 3/06
[52] U.S. Cl. ........................... 426/241; 426/592
[58] Field of Search ......... 426/237, 241, 592, 520, 426/521, 522

[56] References Cited

U.S. PATENT DOCUMENTS

| | | | |
|---|---|---|---|
| 48,728 | 6/1865 | Searle | 426/520 |
| 97,889 | 12/1869 | Crosman et al. | 426/520 |
| 678,891 | 7/1901 | Miller | 426/522 |
| 2,044,898 | 6/1936 | Carrell | 426/520 |
| 2,180,685 | 11/1939 | Little | 426/241 |
| 2,195,662 | 4/1940 | Sant | 426/237 |
| 3,092,503 | 6/1963 | Gray | 426/241 |
| 3,889,009 | 6/1975 | Lipoma | 426/521 |
| 3,934,042 | 1/1976 | De Stoutz | 426/521 |
| 4,417,132 | 11/1983 | Simpson | 426/522 |
| 4,522,834 | 6/1985 | Miyahara | 426/521 |

OTHER PUBLICATIONS

Cross 1975 Home Made Beers, Lasers and Stouts, London, W. Foulsham & Co. Ltd., pp. 36–43.
Conley 1972 Infrared Spectroscopy, Allyn & Bacon Inc., Boston, pp. 6 and 31–32.
Shoog et al. 1971 Principles of Instrumental Analysis, New York, Holt, Rinehart & Winston, Inc., pp. 23, 144, 145.

*Primary Examiner*—Raymond N. Jones
*Assistant Examiner*—Carolyn Paden
*Attorney, Agent, or Firm*—William J. Daniel

[57] ABSTRACT

A wise variety of drinks and foods, such as fruit wine, herb tea, yogurt, fermented soybeans and hot-spring eggs, are produced by heating the raw materials to a temperature of about 60° C. to 100° C. in a vessel, and holding that temperature for a specific length of time, i.e., 3–24 hours for maturation. When producing drinks, it is effective to subject them to a weak vibration, wave motion, forced convection, or stirring force. The method enables the quick production of any desired food or drink in any desired quantity without causing any appreciable reduction in the alcoholic content of, for example, fruit wine.

8 Claims, 7 Drawing Sheets

METHOD OF PRODUCING FRUIT WINE, ETC.

BACKGROUND OF THE INVENTION

1. Field of the Invention

This invention relates to a method which facilitates the production of fruit wine, etc. especially at home. The term "fruit wine, etc." as herein used means fruit wine, and any other food or drink that can be produced by storage at an appropriate temperature, such as herb tea, decoctions, yogurt, fermented soybeans or hot-spring eggs.

2. Description of the Prior Art

There is known Japanese apricot (ume) brandy which can, for example, be produced by placing 1 kg of Japanese apricots, 300 to 400 g of sugar and 1.8 liters of a 70-proof white liquor in a bottle, closing it tightly and storing it in a cold and dark place for a period of at least three months. Lemon wine can, for example, be produced from ten lemons (about 1 kg), 100 to 200 g of sugar and 1.8 liters of a 70-proof white liquor. Each lemon is peeled and cut into two or three pieces. They are placed in a bottle with the rind of two or three lemons, sugar and white liquor. The rind is removed after about four to six days. Otherwise, oil would damage the product. In the absence of the rind, however, it would be impossible to obtain a satisfactorily bitter product. The peeled lemons are removed from the bottle after 30 to 40 days. A period of three months is required for maturation.

All of these methods have the disadvantage of requiring a considerably long period of time in the order of at least three months for maturation. It is impossible to make fruit wine, etc. at home quickly when required.

SUMMARY OF THE INVENTION

It is an object of this invention to provide a method which enables the maturation of fruit wine, etc. within a very short period of time in the order to, say, three to 10 hours or a considerably short period of time in the order of, say, one to 30 days, and thereby the production of a wide variety of foods and beverages each in a small quantity one after another as required, while no large space is required for carrying out the method.

This object is attained by a method which comprises preparing a mixture of raw materials, heating the mixture in a vessel to a temperature of 40° C. to 100° C., and holding that temperature for a specific length of time.

The mixture in the vessel is preferably shaken, stirred, or subjected to a wave motion or forced convection in order to promote the production of fruit wine, etc.

DETAILED DESCRIPTION OF THE INVENTION

The method of this invention can, for example, be used for producing an alcoholic drink from fruits, such as Japanese apricots, lemons, apples, loquats, peaches or strawberries, or medicinal herbs, such as Japanese green gentians, Chinese matrimony vines of aloe by immersing such fruits or herbs in an alcoholic drink of 50 to 130 proof, such as low-class distilled spirits, brandy, gin or whisky, heating them to a temperature of 40° C. to 65° C. and holding them at that temperature for a period of three to 24 hours, whereby a juice is extracted from the fruits or herbs into the alcoholic drink.

Figure 1:
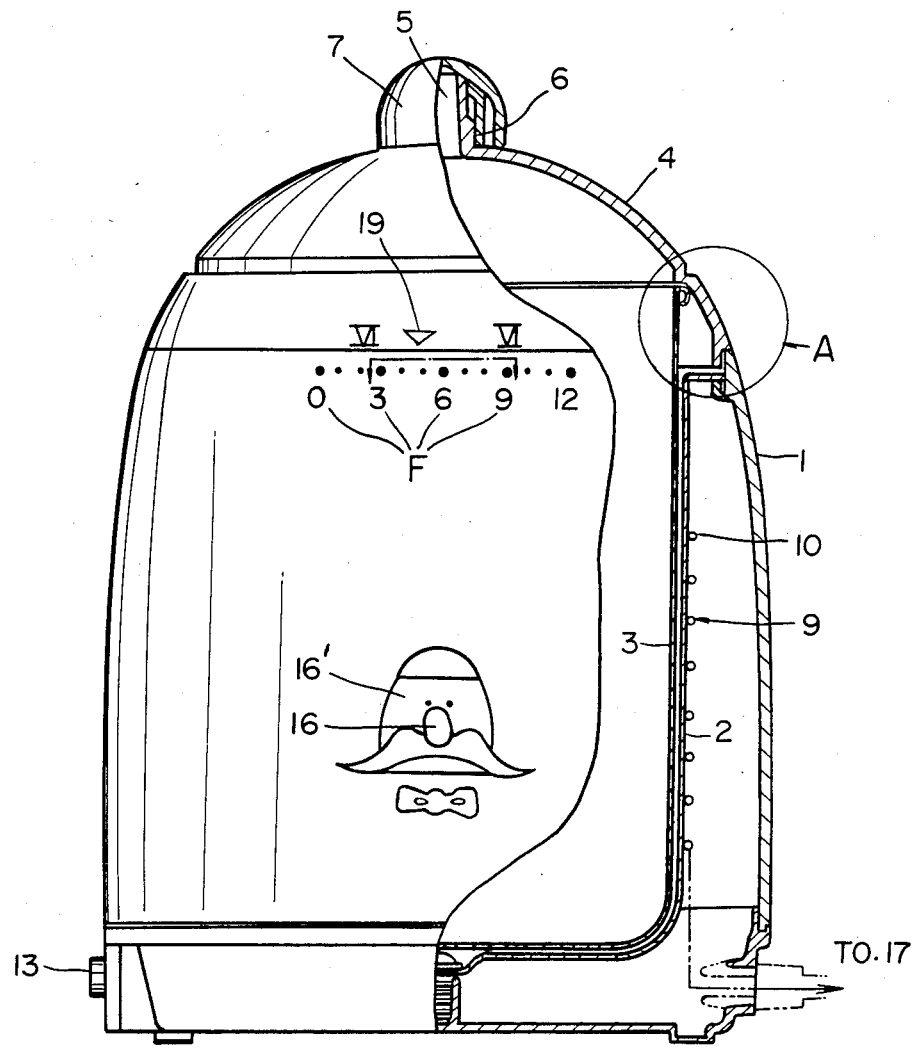
FIG. 1 is a front elevational view, partly in section, of a device which can be used for carrying out the method of this invention.
Figure 2:
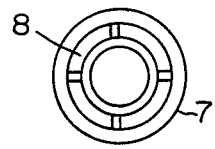
FIG. 2 is a bottom plan view of a cover of the device shown in FIG. 1.

Referring to FIG. 1, there is shown by way of example a device which can be used for carrying out the method of this invention. The device comprises a generally cylindrical housing 1 formed from a heat insulating synthetic resin. Two cylindrical vessels 2 and 3 are provided in the housing 1. They are both formed from a material of high thermal conductivity, such as aluminum. The inner vessel 3 is removably fitted in the outer vessel 2. The device includes a cover 4 for closing the top opening of the housing 1. If the cover 4 is put on the housing 1, it closes the top opening of the inner vessel 3 tightly. The cover 4 is preferably formed from a transparent synthetic resin so that the interior of the inner vessel 3 can be seen through the cover 4. The cover 4 is generally conical and has a hole 5 at its top. Therefore, the cover 4 can be used as a funnel for filling or emptying the inner vessel 3. The hole 5 is defined by a projecting tubular wall 6. The hole 5 is normally closed by a cap 7 which is threadedly fitted about the wall 6. The cap 7 has a groove 8 which enables fluidal communication between the interior of the inner vessel 3 and the exterior of the device if the cap 7 is partly loosened.

Figure 3:
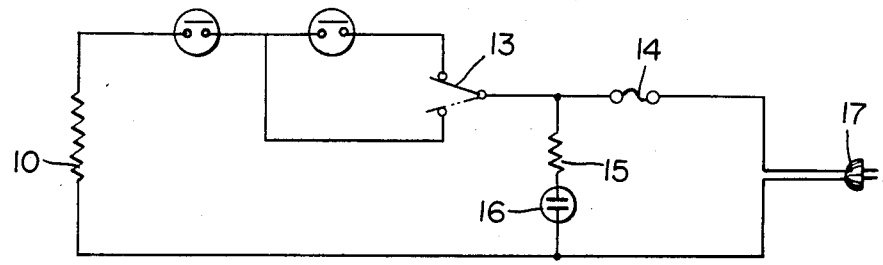
FIG. 3 is a wiring diagram for a heater which may be used for the device.
Figure 3A:
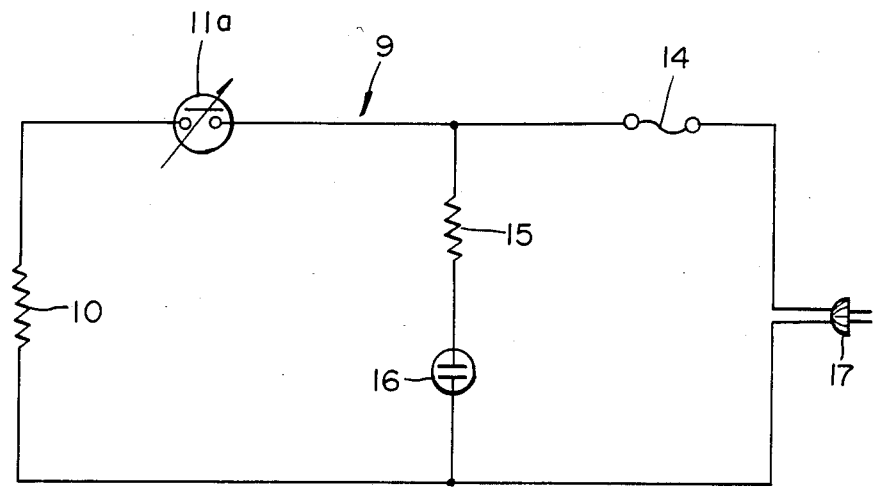
FIG. 3A is a modification to FIG. 3.

The device also includes a heater 9. The heater 9 comprises a heating element 10, which may be a shielded wire, a thermostat 11 set at 60° C., a thermostat 12 set at 40° C., a switch 13 for switching one of the thermostats to the other, a temperature fuse 14, a resistance 15, a pilot lamp 16, and a power source 17 of, say, 100 V AC, as shown by way of example in FIG. 3. The heating element 10 is provided about the outer vessel 2. The heater maintains a temperature of 40° C. or 60° C. FIG. 3A shows a modified heater which includes a variable thermostat 11a, and is otherwise equal in construction to the heater shown in FIG. 3.

The heater 10 may alternatively be a far infrared heater which comprises a nichrome wire or other heating element sealed in a ceramic material. It is preferred that the inner surface of the inner vessel 3 be provided with a film capable of radiating for infrared rays so as to promote the transfer of heat from the infrared heater into the interior of the vessel. This film can be formed by coating, spraying or anodizing the surface with a material having a high radiating efficiency for far infrared radiation, such as zirconia ($ZrO_2$), titania ($TiO_2$) or alumina ($Al_2O_3$). Alternatively, the inner vessel 3 as a whole can be formed from a material having a high radiating efficiency for far infrared radiation, such as porcelain or ceramics.

Figure 4:
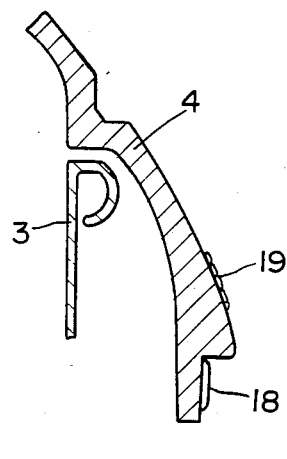
FIG. 4 is an enlarged view of portion A of FIG. 1.
Figure 5:
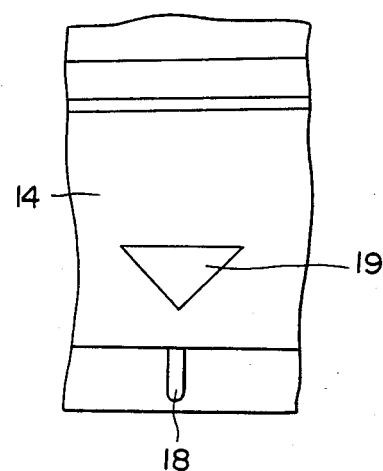
FIG. 5 is a front elevational view of FIG. 4.
Figure 6:
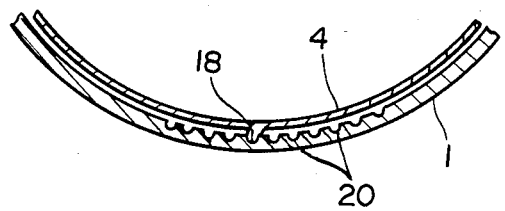
FIG. 6 is a sectional view taken along the line VI—VI of FIG. 4.

The device includes a practically useful feature. The cover 4 has a vertical ridge 18 formed on its outer surface adjacent to its lower end as shown in FIGS. 4 to 6. The outer surface of the cover 4 carries an inverted triangle 19 located exactly above the ridge 18. The housing 1 is formed on its inner surface adjacent to its upper end with a plurality of grooves 20 in which the ridge 18 is selectively engageable. The housing 1 carries on its outer surface a plurality of numerical markings F each aligned with one of the grooves 20. The markings F may, for example, consist of 0, 3, 6, 9 and 12, as shown in FIG. 1. Each number represents the time in hours which is required for the production of a particular product. The triangle 19 can be directed to any of the markings F if the cover 4 is turned appropriately. The person using the device does not need to remember the time at which he must turn off the power source 17.

The pilot lamp 16 is provided on the front of the housing 1. It will be interesting if the housing 1 carries a funny human face 16' having a nose defined by the pilot lamp 16, as shown in FIG. 1.

The cover 4 is useful as a funnel as hereinbefore stated if the cap 7 is removed, and if the cover 4 is inverted. The fluid communication which can be established between the interior and exterior of the inner vessel 3 if the cap 7 is loosened is, for example, useful for the aeration required for the production of fermented soybeans.

Figure 7:
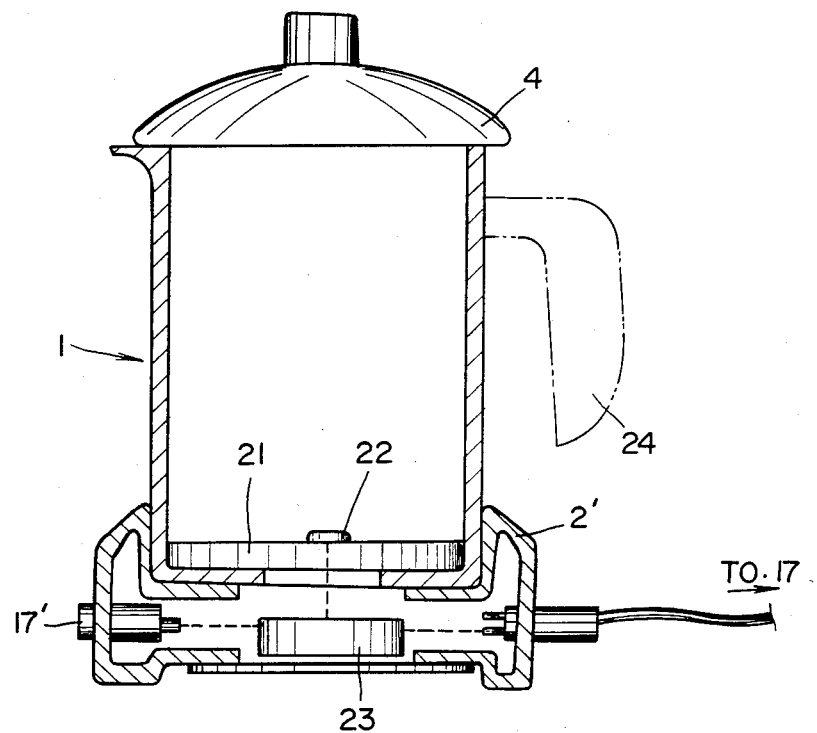
FIG. 7 is a longitudinal sectional view of another device that can be used for carrying out the method of this invention.
Figure 8:
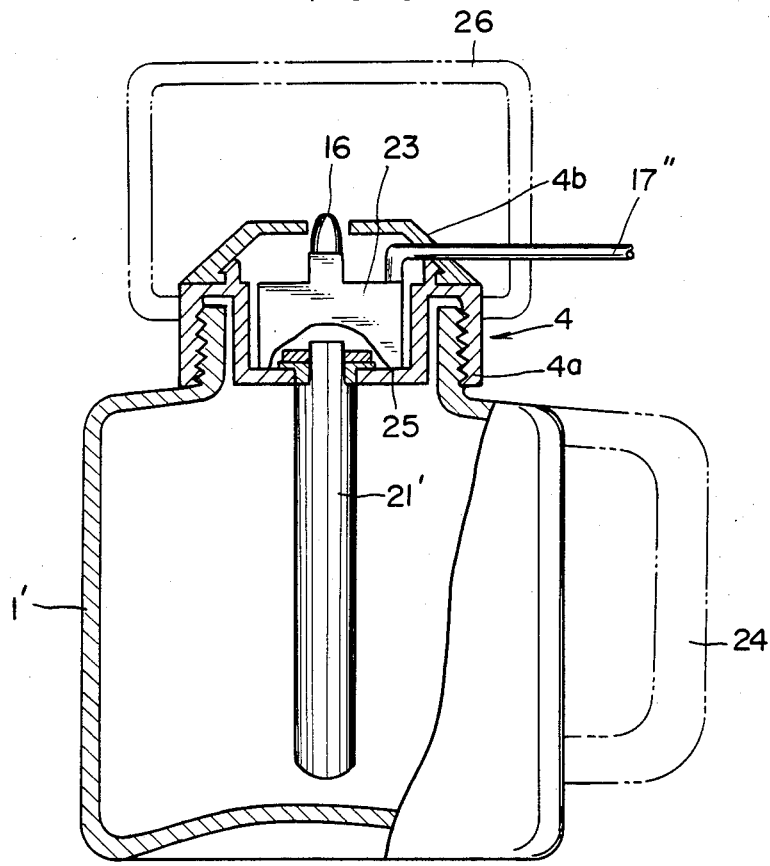
FIG. 8 is a longitudinal sectional view of another device that can be used for carrying out the method of this invention.

Referring now to FIGS. 7 and 8, there are shown different devices which are particularly featured by employing different types of heaters. The device of FIG. 7 includes a watertight, disk-shaped far infrared heater 21 comprising a nichrome or other heating element sealed in a material having a high radiating efficiency for far infrared radiation, such as ceramics. The heater 21 is located at the bottom of an inner vessel 1 held by an outer vessel 2'. FIG. 7 also shows a temperature sensor 22, a power source switch 17', a temperature controller 23 and a handle 24.

The device of FIG. 8 includes a rod-shaped far infrared heater 21' secured to a cover 4. The cover 4 comprises a lower body portion 4a which can be threadedly fitted about the neck of a housing 1', and an upper cap portion 4b. The body portion 4a is of the double-walled construction and has an inner wall defining a central concavity 25 in which a temperature controller 23 is disposed. The heater 21' has an upper end connected to the temperature controller 23 and extends downward into the housing 1'. FIG. 8 also shows a handle 26 attached to the cover 4.

Figure 9:
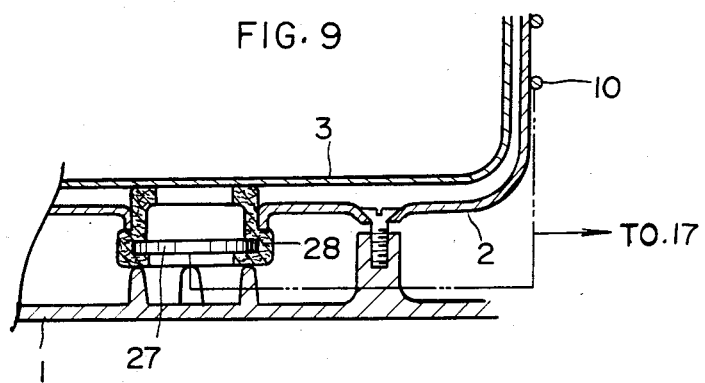
FIG. 9 is a fragmentary sectional view of another device that can be used for carrying out the method of this invention.

Referring to FIG. 9, another device useful for carrying out the method of this invention includes a vibrator 27 provided between the bottom of the housing 1 and the bottom of the outer vessel 2 substantially at the center of the bottom of the device. The vibrator 27 is provided for vibrating the inner vessel 3 with a light force to promote the extraction of a juice for producing fruit wine, etc. Packing 28 is disposed between the bottom of the housing 1 and the vibrator 27 for preventing the vibration of the housing 1. The vibrator 27 may, or may not, be directly in contrct with the inner vessel 3.

Figure 10:
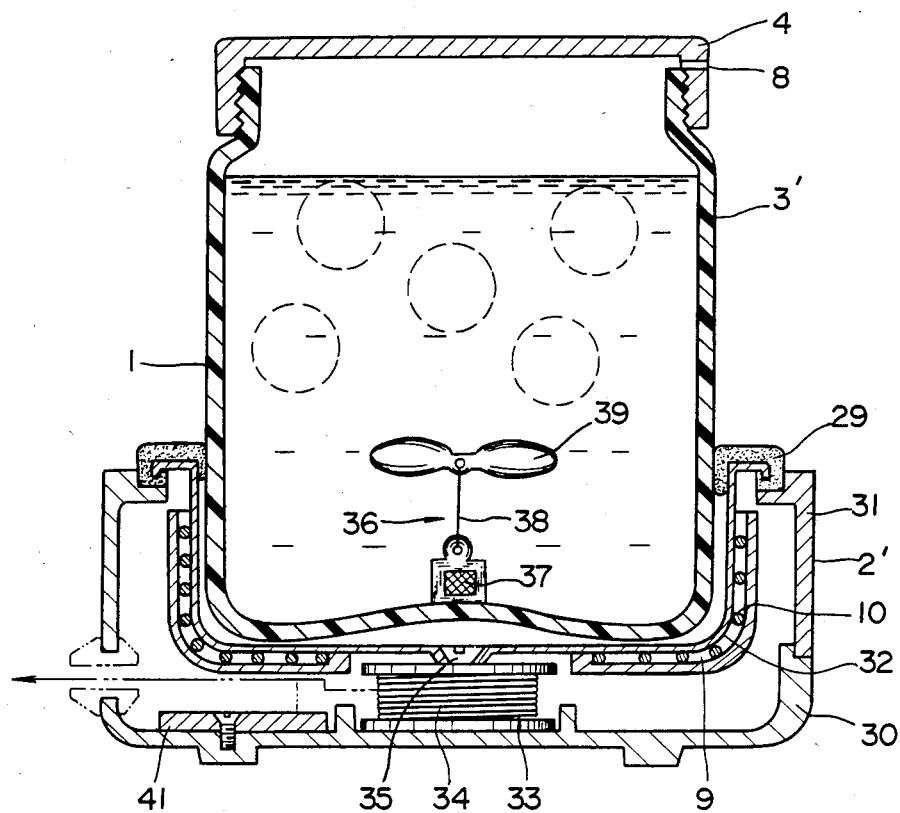
FIG. 10 is a longitudinal sectional view of still another device that can be used for carrying out the method of this invention.

Referring to FIG. 10, another device includes a housing 1 which is defined by an inner vessel 3' formed from a transparent glass or synthetic resin and having a top opening, as is the case with the device of FIG. 7. A transparent cover 4 is provided for closing the top opening of the inner vessel 3'. An outer vessel 2' surrounds the bottom of the inner vessel 3'. Packing 29 is provided between the inner and outer vessels 3' and 2'. The outer vessel 2' comprises a bottom wall 30, an outer sidewall 31 and an inner wall 32. A coil 33 of copper wire is supported on the center of the bottom wall 30 and defines a magnetic force generator 34. The coil 33 is connected to the inner wall 32 by a screw 35. The inner wall 32 carries a heating element 10 constituting a heater 9. The coil 33 and the heating element 10 are appropriately connected to a power source not shown.

Figure 10A:
FIG. 10A is a view showing a modification to a part of the device shown in FIG. 10.

A shaker 36 is provided in the inner vessel 3'. It is adapted for movement by the magnetic force generator 34. It comprises a permanent magnet 37 having N and S poles and comprising a ferrite enclosed by a polyethylene resin, and a twin blade 39 formed from a polyethylene resin and connected to the magnet 37 by a strand 38. The shaker may alternatively comprise an elongate rotor 40 formed from a permanent magnet as shown in FIG. 10A. FIG. 10 also shows a control panel 41. The magnet 37 is moved by the magnetic force generator 34 when the coil 33 is energized. The movement of the magnet 37 is enlarged and transmitted to the blade 39. The blade 39 thus imparts a weak wave motion or forced convection to the contents of the inner vessel 3' to bring about an active molecular motion and thereby promote the necessary extraction, while stirring the contents uniformly.

Figure 11:
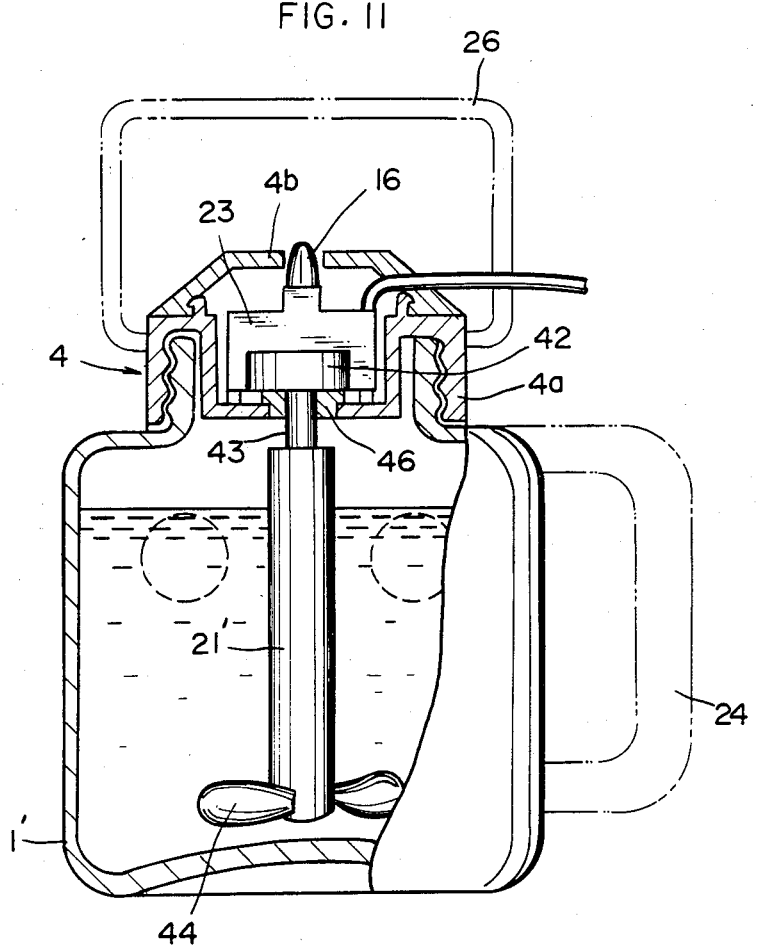
FIG. 11 is a longitudinal sectional view of still another device that can be used for carrying out the method of this invention.
Figure 12A:
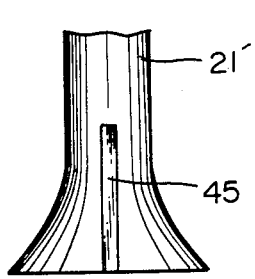
FIG. 12A is a fragmentary side elevational view of a different stirrer which can be employed in the device shown in FIG. 11.
Figure 12B:
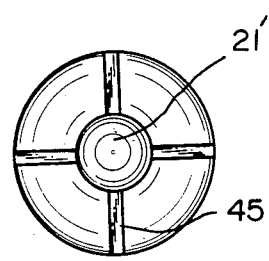
FIG. 12B is a bottom plan view of the stirrer shown in FIG. 12A.

Still another device is shown in FIG. 11. It is a modification to the device of FIG. 8. It includes a motor 42 having anoutput shaft 43 connected to the rodshaped heater 21' so that the heater 21' may be rotatable about its own axis. The heater 21' is provided at its lower end with a stirrer defined by a twin blade 44. The stirrer may alternatively be defined by a plurality of tongues 45 projecting radially outwardly from the heater 21' adjacent to its lower end, as shown in FIGS. 12A and 12B. The lower end of the heater 21' is preferably located close to the bottom of the housing 1' so that the stirrer may be so positioned. FIG. 11 also shows packing 46.

The invention is not limited to the various embodiments thereof as hereinabove described. The medium used for extracting fruits, etc. is not limited to an alcoholic drink or water, but it is also possible to use, for example, an edible oil or an infusion.

The invention will now be described more specifically with reference to several examples thereof.

EXAMPLE 1

Japanese apricot brandy and lemon wine were produced by employing the device shown in FIGS. 1 to 6. A temperature of 60° C. was employed for their production. Table 1 shows the pH of each beverage which varied with the lapse of time.

TABLE 1

| Hours | Japanese apricot brandy | Lemon wine |
| --- | --- | --- |
|  | (5.5) | (5.5) |
| 5 | 4.3 | 4.5 |
| 10 | 3.7 | 3.8 |
| 15 | 3.5 | 3.7 |
| 20 | 3.3 | 3.4 |
| 25 | 3.2 | 3.3 |
| 35 | 3.2 | 3.3 |
| 50 | 3.2 | 3.3 |
| 70 | 3.2 | 3.3 |

Japanese apricot brandy and lemon wine were also produced by a conventional method. The Japanese apricot brandy had a pH of about 3.3, and the lemon wine had a pH of 3.4 to 3.5. Panel tests indicated the same results.

Similar drinks were produced by employing a temperature of 40° C. Both of the Japanese apricot brandy and the lemon wine showed a pH substantially equal to that of the drinks produced by the conventional method, with the lapse of about 30 days. The same results were obtained from panel tests.

EXAMPLE 2

Japanese apricot brandy and lemon wine were produced by employing a number of devices of the construction shown in FIGS. 7 and 8, but including (1) a housing of stainless steel not radiating far infrared rays, (2) an aluminum housing having an inner surface coated with zirconia ($ZrO_2$), and (3) an aluminum housing coated with a film of alumina. A temperature of 60° C. was employed for their production. TABLES 2 and 3 show the pH of each drink which varied with the lapse of time.

TABLE 2

| | (Japanese apricot brandy) | | |
| --- | --- | --- | --- |
| Hours | (1) Stainless steel housing | (2) Aluminum housing coated with zirconia | Aluminum housing coated with alumina |
| 0 | (5.5) | (5.5) | (5.5) |
| 1 | 4.3 | 4.3 | 4.3 |
| 3 | 3.8 | 3.7 | 3.7 |
| 5 | 3.6 | 3.4 | 3.5 |
| 6 | 3.4 | 3.2 | 3.3 |
| 8 | 3.3 | 3.2 | 3.2 |

TABLE 3

| | (Lemon wine) | | |
| --- | --- | --- | --- |
| Hours | (1) Stainless steel housing | (2) Aluminum housing coated with zirconia | (3) Aluminum housing coated with alumina |
| 0 | (5.5) | (5.5) | (5.5) |
| 1 | 4.6 | 4.5 | 4.5 |
| 3 | 3.8 | 3.7 | 3.8 |
| 5 | 3.7 | 3.6 | 3.7 |
| 6 | 3.5 | 3.3 | 3.4 |
| 8 | 3.3 | 3.2 | 3.2 |

As is obvious from TABLES 2 and 3, the method of this invention which is carried out by employing a device of the construction as shown in FIGS. 7 or 8 is effective for shortening the time for maturation drastically, particularly if the housing or vessel has a high efficiency of far infrared radiation.

Similar drinks were produced by employing a temperature of 40° C. They showed a pH comparable to that of the conventionally prepared drinks with the lapse of about 20 days. There was no difference in taste or flavor between the products of the method of this invention and the products of the conventional method.

EXAMPLE 3

Yogurt was produced by heating a mixture of milk and lactic bacteria at 40° C. for six to eight hours in the device shown in FIGS. 1 to 6.

EXAMPLE 4

Fermented soybeans were produced by heating a mixture of boiled soybeans and bacteria at 40° C. for about 20 hours in the device shown in FIGS. 1 to 6.

EXAMPLE 5

Hot-spring eggs were produced in the device of FIGS. 1 to 6 by heating water in the inner vessel to 65° C., placing eggs therein, putting the cover and supplying an electric current for about 12 minutes.

EXAMPLE 6

Japanese apricot brandy and lemon wine were produced by repeating the procedure of Example 1, except that the the device shown in FIG. 9 was used to impart a weak vertical vibration to the inner vessel. Table 4 shows the pH of each drink which varied with the lapse of time.

TABLE 4

| Hours | Japanese apricot brandy | Lemon wine |
| --- | --- | --- |
|  | (5.5) | (5.5) |
| 1 | 4.3 | 4.5 |
| 3 | 3.7 | 3.8 |
| 5 | 3.5 | 3.7 |
| 6 | 3.3 | 3.4 |
| 8 | 3.2 | 3.3 |

EXAMPLE 7

Japanese apricot brandy and lemon wine were produced by repeating the procedure of Example 1, but employing the devices shown in FIGS. 10 and 11. The pH characteristics of each drink were equal to those shown in Table 4.

As is obvious from the foregoing description, the method of this invention has a lot of advantages including the following:

(1) A period of only three to 24 hours is required for maturation, as opposed to the two or three months hitherto required. It is possible to drink, for example, fruit wine within the day when its production is started.

(2) Insofar as alcohol has a boiling point of 78° C., there is hardly any change in the alcoholic content of the beverage heated to, say, only 60° C. in a vessel having a cover as hereinabove described. (3) The promoted extraction of a juice from fruits does not appreciably differentiate the taste of the product according to the method of this invention from that of the product according to the conventional method.

(4) Insofar as only a very short time is required for making a particular product, it is not necessary to produce a large quantity at a time. It is sufficient to produce only a quantity which is required from time to time. No large space is, thus, required for carrying out the method of this invention. The method of this invention provides a great deal of pleasure, as it enables the production of a variety of foods and drinks one after another.

(5) Insofar as only a short time is required for making each product, it is possible to try a variety of different combinations of fruits, sugar, white liquor, etc., as well as different periods of maturation, thereby enabling everybody to pursue his favorite taste or flavor.

(6) The magnetic vibration, or agitation by the blade creates a relative motion between the surfaces of the fruits or herbs and the extraction medium to promote the extraction of the juice drastically. The vibration or agitation is also effective for promoting the dissolution of sugar, which would otherwise tend to gather at the bottom of the vessel, and thereby the production of wine, etc. having a uniform sugar content.

What is claimed is:

1. An infusion method of extracting extractable substances from a generally solid edible organic material containing the same, which comprises immersing said organic material in a body of alcoholic medium of about 50–130 proof held within a container having an inner surface lined with a film of zirconia, titania or alumina, and exposing the exterior of said container to far infrared radiation to heat said medium to a temperature in the range of about 40° C.–100° C. for a time of about 3–24 hours.

2. A process according to claim 1 for preparing a fruit flavored alcoholic beverage wherein said generally solid organic material is solid fruit.

3. A method according to claim 1 wherein said organic material is subjected to motion while immersed in said medium heated to said temperature.

4. A method as set forth in claim 1, wherein said container is formed from a material having a high efficiency of far infrared radiation.

5. A method as set forth in claim 4, wherein said container is formed from a material selected from porcelain and ceramics.

6. A method as set forth in claim 1, wherein said container is formed from a material selected from aluminum and stainless steel.

7. A method as set forth in claim 1, wherein said film is formed by a method selected from coating, spraying and anodizing.

8. A method as set forth in claim 1, wherein said container is formed from a transparent material selected from glass and a synthetic resin.

* * * * *